United States Patent Office 2,833,501
Patented May 6, 1958

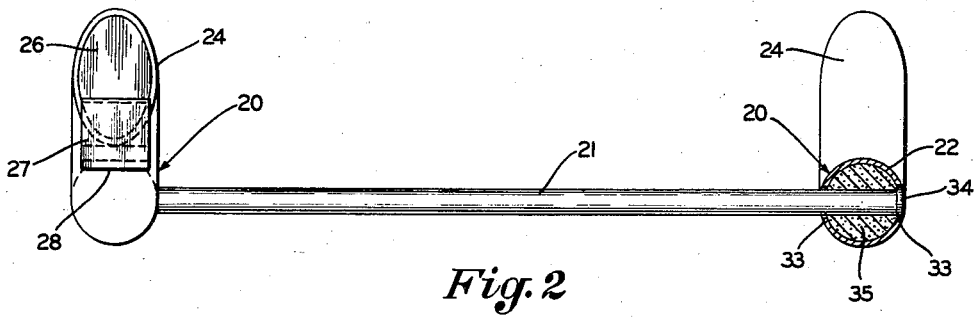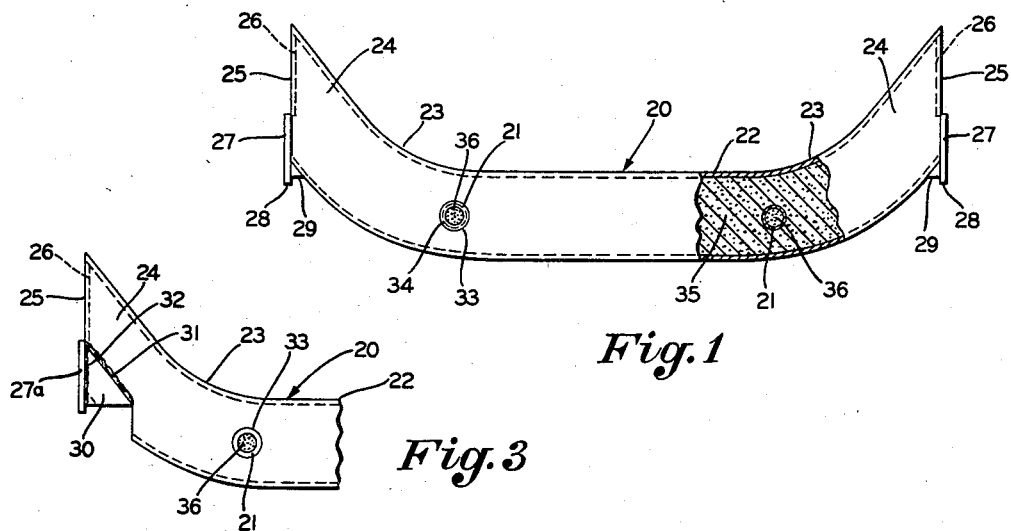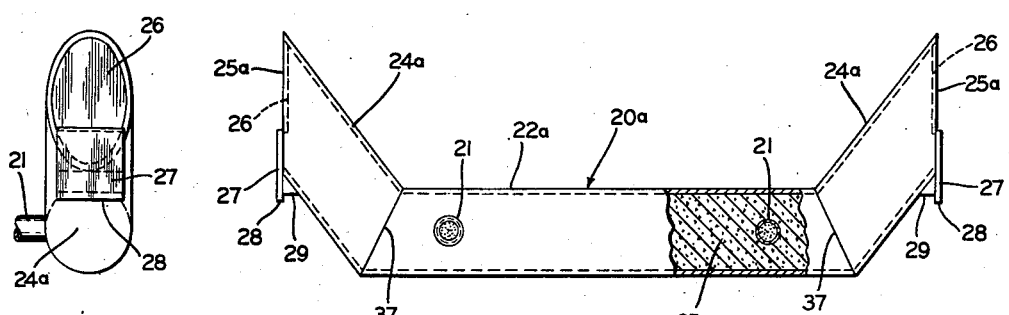

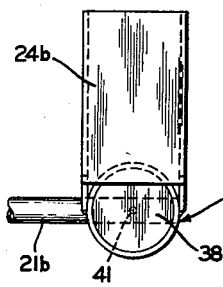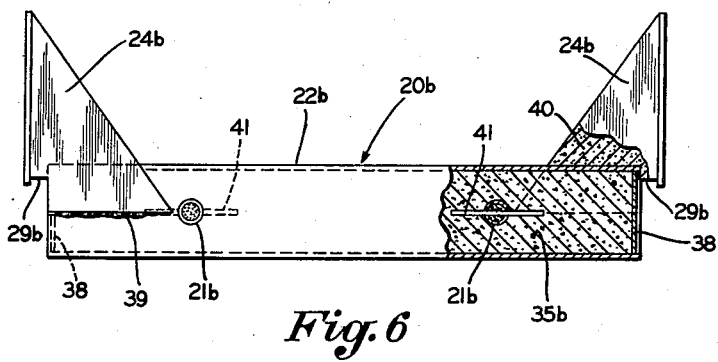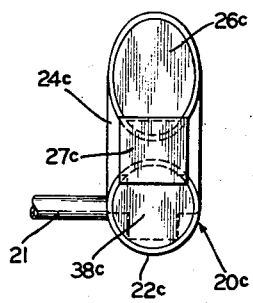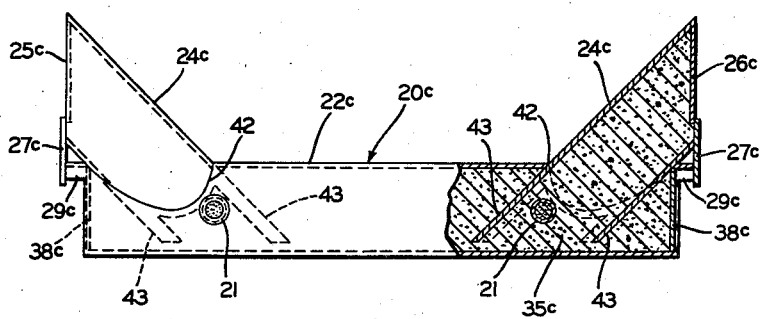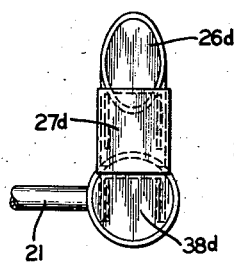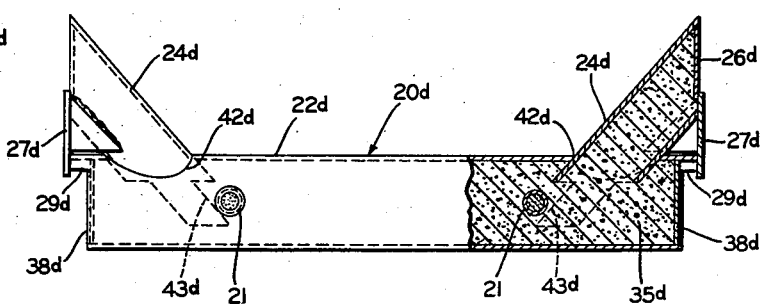

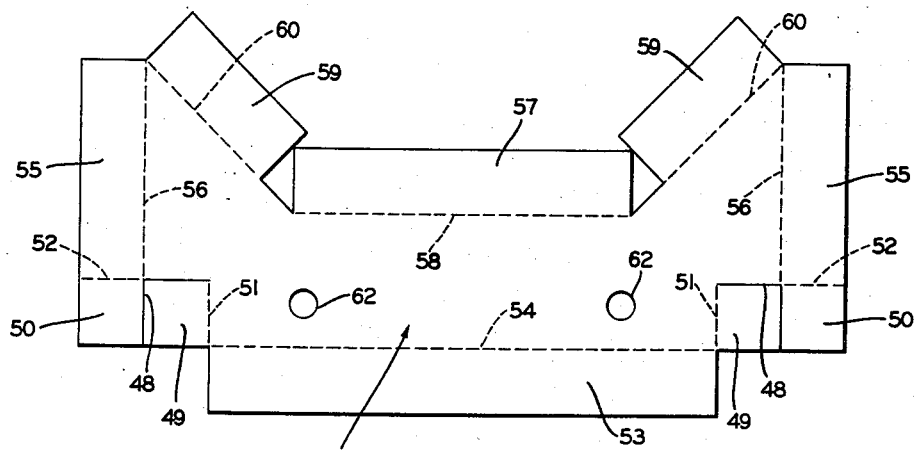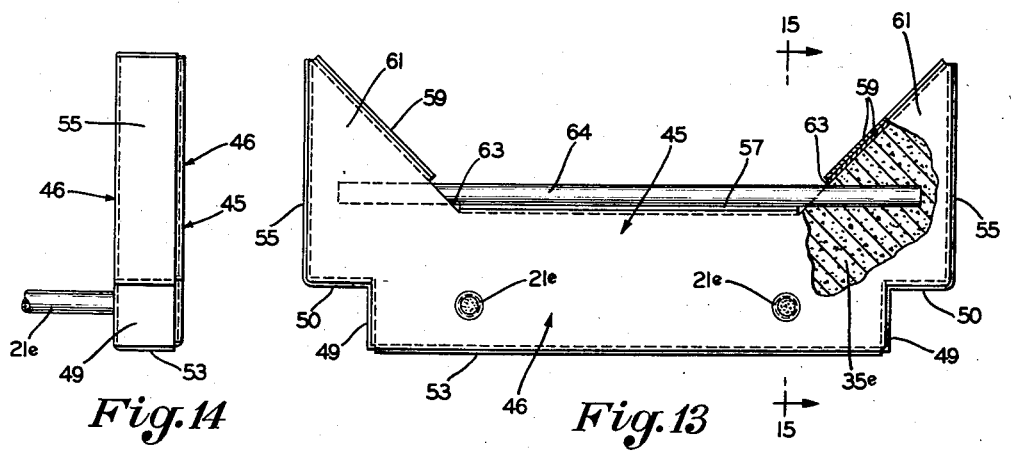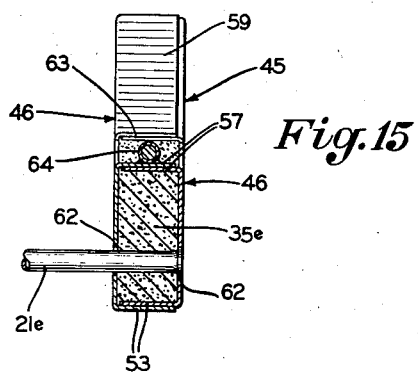

2,833,501

METAL HANDLING AND STORAGE BOLSTER

Frederick H. Evans, Massillon, Ohio, assignor to Evans Enterprise, Inc., Massillon, Ohio, a corporation of Ohio Application March 21, 1955, Serial No. 495,442

9 Claims. (Cl. 248—120)

The invention relates to the handling and storage of elongated objects of various kinds, such for instance as billets, bars, rods, tubes and other lengths of metal, or other materials, and more particularly to a bolster or rack for receiving and supporting a plurality of such elongated objects.

In steels mills where such metal lengths are produced, as the bars, rods, tubes or the like are rolled they are removed from the mill to a storage place where they are segregated as to size and shape. The metal lengths remain at the storage place until removal for shipment to customers, or for further fabrication.

It is becoming general practice in many steel plants, to place such metal lengths upon bolsters or racks, as they emerge from the mill. These loaded bolsters are picked up, usually by straddle carriers and transported to a storage place.

When it is desired to remove the bars, rods, tubes or other metal lengths from the storage place, for shipment or other purpose, they are usually removed from the bolster by a magnet and placed in trucks or cars, and the empty bolsters are returned to the mill by a straddle carrier or the like.

Such bolsters as are now in use for this purpose usually comprise two end members connected together in spaced relation by a spaced pair of tubes, rods or the like. The end members of these bolsters are usually provided at opposite ends with upright extensions or ears, so that the bars, rods, tubes or the like may be piled to some considerable height upon the bolsters.

As the magnets by which the metal lengths are removed from the bolsters are extremely heavy, generally weighing several tons, and these magnets are usually suspended upon chains, cables or other flexible elements from a movable boom, as the boom carrying such magnet is moved adjacent to the bolsters, the magnet swings upon its flexible support, frequently striking the upright extensions or ears of the bolsters and breaking or damaging the same and rendering the bolsters unfit for further use. This results in considerable expense for repairs or replacement of the bolsters.

Furthermore, such bolsters as are now in general use are relatively expensive, thus materially increasing the cost of handling and storage of bars, rods, tubes and other metal lengths.

It is therefore a primary object of the present invention to provide a relatively inexpensive bolster of rugged construction which will not be easily damaged as by impact with a heavy magnet or the like.

Another object is to provide such a bolster having end members in the form of relatively thin metal shells filled with concrete, and connected together in spaced relation by tubes or bars, the ends of which are embedded in the concrete in the end members.

A further object is to provide such a bolster in which the metal shells are in the form of pipes or tubes of relatively large diameter.

A still further object is to provide a bolster of the character referred to in which each end member has hollow upright extensions at its ends, filled with concrete so as to resist impact.

Another object of the invention is to provide a bolster of this type in which each end member is formed of a single section of large diameter pipe, the ends of which are bent upwardly to provide upright extensions at each end thereof.

It is also an object of the invention to provide such a bolster having means thereon for engagement by the load hooks of a straddle carrier.

Still another object is to provide a bolster of the character referred to, in which the shell for each end member is formed of a pair of similarly formed metal sheets attached together as by spot welding.

The above objects together with others which will be evident from the drawings and following description, or which may be later referred to, may be attained by constructing the improved bolsters in the manner illustrated in the drawings and hereinafter described in detail.

In general terms, the invention may be briefly described as comprising a bolster having two similar end members, each having upright extensions at its ends, each end member being formed of a hollow metal shell filled with concrete, the end members being connected together in spaced relation by a pair of rods or tubes, the ends of which are embedded in the concrete in the end members.

More specifically, the hollow shell for each end member may be formed of metal pipe of relatively large diameter, and the upright extensions at the ends thereof may be formed by bending the ends of the pipe upwardly, or by welding angularly disposed pieces of pipe thereto, or by inserting angularly disposed pieces of smaller diameter pipe into openings cut in the top thereof.

In one modification, the extensions may be hollow, substantially triangular shells welded to opposite ends of the pipe, and also filled with concrete. In another modification, the shell for each end member may be formed of two similar sheet metal members, shaped and bent to provide integral end extensions, and welded together.

Embodiments of the invention are illustrated in the accompanying drawings, in which;

Fig. 1 is an end elevation, with parts broken in section, of a bolster in which each end member is formed of a similar section of pipe, the ends of which are bent upward to form upright extensions;

Fig. 2 a side elevation, with parts broken in section, of the bolster shown in Fig. 1;

Fig. 3 a fragmentary elevation of one end portion of a slightly modified form of end frame;

Fig. 4 an end elevation of a bolster having a modified form of end frame formed of a section of pipe with the ends cut off at upwardly converging angles, and shorter sections of similar pipe welded thereto to form upright extensions;

Fig. 5 an end elevation of the end frame shown in Fig. 4;

Fig. 6 an end elevation, with parts broken in section, of a bolster having a modified form of end frame comprising a straight section of pipe with substantially triangular shells welded to opposite ends thereof to form extensions thereon;

Fig. 7 an end elevation of the modified form of end frame shown in Fig. 6;

Fig. 8 an end elevation, partly in section, of a bolster having another modified form of end frame comprising a straight section of pipe having openings near opposite ends in the top thereof, and shorter sections of similar pipe angularly inserted into said openings;

Fig. 9 an end elevation of the end frame shown in Fig. 8;

Fig. 10 an end elevation of a bolster, partly in section, showing another modified form of end frame comprising a straight section of relatively large diameter pipe with openings in the top thereof near opposite ends, and short sections of smaller diameter pipe angularly inserted therein;

Fig. 11 an end elevation of the end frame shown in Fig. 10;

Fig. 12 a plan view of a sheet metal blank for forming one-half of the shell of another modified form of end frame;

Fig. 13 an end elevation, partly in section, of a bolster having the end frame formed of two members produced by the blank of Fig. 12;

Fig. 14 an end elevation of the end frame shown in Fig. 13; and,

Fig. 15 a section on the line 15—15, Fig. 13.

Referring now more particularly to the embodiments of the invention illustrated in the accompanying drawings, in which similar numerals refer to similar parts throughout, the bolster shown in Figs. 1 to 3 comprises two similar end members, indicated generally at 20, connected in spaced relation by a pair of tubes or rods 21.

Each end member 20 comprises a hollow sheet metal shell filled with concrete to reinforce and strengthen the same. This metal shell, as shown in Figs. 1 to 3, comprises a section of pipe 22, opposite ends of which are bent upward on a radius as indicated at 23 to form the upright extensions 24 at each end of the frame member.

In actual practice, the pipe 22 used for this purpose is an 8" diameter pipe such as is commonly used for gas lines. Opposite ends of the pipe section forming each frame member 20 are cut off vertically, as indicated at 25, and these ends of the pipe section may be closed as by substantially elliptic metal plates 26 tack welded therein.

For the purpose of providing means for engaging the end frame members by the load hooks of a straddle carrier, a substantially rectangular plate 27 may be welded to the lower portion of each end of the frame member, depending below the same as indicated at 28, a substantially triangular filler 29 being welded between the lower portion of the rectangular plate 27 and the adjacent curved portion of the pipe.

In Fig. 3 is shown a slight modification of this feature adapted for engagement by an older type of straddle truck grip jaws. For this purpose, a triangular section is cut out of the underside of each upwardly curved portion of the pipe, as indicated at 29. The rectangular plate 27a in this form is substantially the same as the plate 27 in Figs. 1 and 2, and a triangular plate 30 is welded to each side of each extension 24 of the pipe, as indicated at 31, and to the inner surface of the rectangular plate 27a, as indicated at 32.

The rods or tubes 21 which connect the end frames 20 in spaced relation are inserted through apertures 33 in the end frames 20, and the opposite ends of these rods or tubes may be beaded or shouldered as indicated at 34.

A mixture of hydraulic cement and aggregate is poured into each hollow shell, entirely filling the same with concrete, as indicated at 35. When this concrete mixture hardens it forms a reinforcing for each entire frame member, including the upright extensions thereon, and securely anchors the tubes or rods 21 within the end frame members, the beads or shoulders at the ends of the tubes or rods assisting in securing the same therein.

In pouring the concrete mixture into these end frame members, one end of each frame member may be left open and the member stood on end with the closed end downward, so that the concrete mixture may be poured into the open end thereof. After filling with concrete the end plate 26 may be tack welded to the open end. If the connecting members 21 are tubes, they are preferably also filled with concrete, as indicated at 36, so as to strengthen and reinforce the same.

In the modification shown in Figs. 4 and 5, each end frame is indicated generally at 20a and may comprise a straight section 22a of pipe having opposite ends cut off at upwardly converging angles, as indicated at 37. Shorter sections of similar pipe, as indicated at 24a, are welded to the angular ends 37 of the pipe 22a to form upright extensions at each end of each frame member.

The outer ends of these extensions are cut off vertically as at 25a and may be finished in the same manner as the ends of the extensions in Figs. 1 and 2, being closed by the substantially elliptic plates 26 and rectangular plates 27 which provide the shouldered offsets 28—29 for engagement by the load hooks of a straddle carrier.

The end frames 20a may be connected together by tubes or rods 21 in the same manner as shown in Figs. 1 to 3, and the end members filled with concrete as indicated at 35a.

Another modification of the end frame is shown in Figs. 6 and 7, in which the end frame, indicated generally at 20b, comprises a straight section of pipe 22b, the straight ends of which are adapted to be closed by metal discs 38, tack welded thereto.

Upright extensions may be formed at opposite ends of this frame by means of substantially triangular sheet metal shells 24b welded to opposite sides of the pipe section 22b, as indicated at 39. The pipe section 22b is filled with concrete as indicated at 35b and these triangular end extensions may also be filled with concrete as indicated at 40.

The tubes or rods 21b have opposite end portions located through the end frames 20b in the manner above described, and may have transverse pins 41 located therethrough to anchor the same securely within the concrete. The triangular shells 24b may extend beyond opposite ends of the pipe section 22b to provide shoulders 29b for engagement by the load hooks of a straddle carrier.

In the modification of the end frame shown in Figs. 8 and 9, and indicated generally at 20c, the shell may be formed by the straight section 22c of pipe, the straight ends of which may be closed by the discs 38c, tack welded therein. The upright extensions may be formed by shorter sections of similar pipe as indicated at 24c located through suitably formed apertures 42 cut into the upper side of the pipe 22c near opposite ends thereof.

Extensions 43 are formed upon the lower ends of the angular pipe sections 24c, and when the shell thus formed is filled with concrete, as indicated at 35c, these extensions may be embedded therein filling the upright extensions 24c rigidly in place. If desired, these pipe sections 24c may be welded to the pipe section 22c around the openings 42 therein.

The outer ends of the angular extensions 24c may be cut off vertically, as indicated at 25c, and may be closed by the substantially elliptic plates 26c tack welded or otherwise secured thereto.

Shoulders 29c, for engagement by the grip jaws of a straddle truck, may be formed at opposite ends of the frame member by the rectangular plates 27c. Tubes or rods 21 may be the same as shown in Figs. 1 to 5, or as shown at 21b in Figs. 6 and 7.

In Figs. 10 and 11 is shown another modified form of end frame for such bolster, in which each end frame, indicated generally at 20d, is formed of a straight section of pipe 22d, to opposite ends of which are connected angularly disposed shorter pipe sections 24d of smaller diameter.

These smaller pipe sections are angularly inserted through apertures 42d formed in the top of the pipe section 22d, near opposite ends thereof, and may be welded thereto. Extensions 43d are formed upon the lower ends of the pipe sections 24d and adapted to be embedded in the cement 35d with which the entire shell of the end frame is filled.

The ends of the pipe section 22d are cut off at 38 in the same manner as in Figs. 8 and 9, and adapted to be closed by the discs 38d, and have the shoulders 29d formed at each end for engagement by the load hooks of a straddle carrier.

The outer ends of the upright extensions 24d may be closed by substantially elliptic plates 26d, and rectangular plates 27d may extend downward from the ends of said angular extensions to the shoulders 29d. The end frames may be connected in spaced relation by tubes or rods 21 which may be either as shown in Figs. 1 to 3 or in Figs. 6 and 7.

Still another modification of end frame is shown in Figs. 12 to 15, in which each end frame, indicated generally at 45, is formed of two similar sheet metal members tack welded or otherwise attached together to form a hollow shell.

Each of the sheet metal members making up the shell is indicated generally at 46, and each is made from a blank as indicated generally at 47 in Fig. 12. Each blank has a right angle slit 48 at each lower corner portion, forming at each of these corners a pair of rectangular flanges 49 and 50 adapted to be bent inwardly and upwardly respectively along the dotted lines 51 and 52.

An alongated bottom flange 53 is formed at the bottom of the blank, and adapted to be bent upwardly, along the dotted line 54, and a vertical flange 55 is formed at each end of the blank, adapted to be bent inwardly along the dotted line 56.

A central, elongated flange 57 is formed at the top of the blank 47 and adapted to be bent downwardly along the dotted line 58, and at each end thereof is an inclined flange 59 adapted to be bent downwardly along the dotted line 60.

When these flanges are bent in the manner above described, two of the members 46 are telescoped together, as shown in Figs. 13 to 15, and tack welded so as to form a hollow, elongated shell with angularly disposed upright extensions 61 at opposite ends and shoulders 50 at opposite lower corners to receive the load hooks of a straddle carrier.

Each member 46 of the shell is provided with openings 62, through which tubes or rods 21e may be located so as to be embedded in the concrete mixture 35e with which the shell is filled. When the shell is thus formed it will be seen that an opening 63 is formed at the juncture of each upright extension with the upper central portion of the shell, through which openings the concrete mixture may be poured.

If desired, for the purpose of presenting a relatively small metal surface to the magnet, by which the metal lengths may be removed from the bolster, a small diameter rod, tube or the like, as indicated at 64, may be located upon the top surface 57 of each end frame, the ends of said tube or rod extending through the openings 63 and into the triangular extensions 61 and embedded in the concrete mixture 35e.

From the above it will be obvious that a simple, inexpensive and rugged bolster is thus provided, which will be capable of carrying a considerable weight, which will not be easily damaged by impact with a heavy magnet or the like, and which presents a relatively small metal surface to the magnet ordinarily used for removing the metal lengths from the bolster, so that the bolster itself will not be picked up by the magnet.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:
1. A bolster for handling and storage of elongated objects, said bolster comprising a spaced pair of end frames and a spaced pair of connecting and spacing members, each end frame comprising a straight elongated tubular metal shell having upright diverging tubular extensions at its ends, and concrete entirely filling each shell including said extensions, the end portions of said connecting and spacing members being located entirely through the end frames and embedded in said concrete.

2. A bolster for handling and storage of elongated objects, said bolster comprising a spaced pair of end frames and a spaced pair of connecting and spacing members, each end frame comprising a straight elongated tubular metal shell having upright diverging tubular extensions at its ends, and concrete entirely filling each shell including said extensions, the end portions of said connecting and spacing members being located entirely through the end frames and embedded in said concrete, said connecting and spacing members comprising metal tubes, and concrete filling said metal tubes.

3. A bolster as defined in claim 1, in which the upright diverging tubular extensions are curved.

4. A bolster for handling and storage of elongated objects, said bolster comprising a spaced pair of end frames and a spaced pair of connecting and spacing members interposed between and having their end portions engaged in said end frames, each end frame being formed of metal pipe having a straight elongated central portion having openings in its upper side near each end thereof, angularly disposed diverging short pipe sections inserted through said openings and forming upright extensions, means closing the ends of the straight central portion, means closing the ends of the angularly disposed short pipe sections, and concrete filling said straight central portion and said angularly disposed short pipe section.

5. A bolster for handling and storage of elongated objects, said bolster comprising a spaced pair of end frames and a spaced pair of connecting and spacing members interposed between and having their end portions engaged in said end frames, each end frame being formed of metal pipe having a straight elongated central portion having openings in its upper side near each end thereof, angularly disposed diverging short pipe sections of smaller diameter than said straight central portion inserted through said openings and forming upright extensions, means closing the ends of the straight central portion, means closing the ends of the angularly disposed short pipe sections, and concrete filling said straight central portion and said angularly disposed short pipe sections.

6. A bolster for handling and storage of elongated objects, said bolster comprising a spaced pair of end frames and a spaced pair of connecting and spacing members interposed between and having their end portions engaged in said end frames, each end frame being formed of metal pipe having a straight elongated central portion having openings in its upper side near each end thereof, angularly disposed short pipe sections inserted through said openings and forming upright diverging extensions, means closing the ends of the straight central portion, means closing the ends of the angularly disposed short pipe sections, and concrete filling said straight central portion and said angularly disposed short pipe sections, and legs upon the lower ends of said short pipe section embedded in said concrete.

7. A bolster for handling and storage of elongated objects, said bolster comprising a spaced pair of end frames and a spaced pair of connecting and spacing members interposed between and having their end portions engaged in said end frames, each end frame being formed of a straight elongated section of metal pipe, means closing the ends thereof, a metal shell attached to each end of said pipe section and forming upright diverging substantially triangular extensions thereon, and concrete filling said pipe sections and said triangular shells.

8. A bolster for handling and storage of elongated objects, said bolster comprising a spaced pair of end frames and a spaced pair of connecting and spacing members interposed between and having their end portions engaged in said end frames, each end frame comprising a straight elongated metal shell having upwardly and outwardly diverging extensions at opposite ends, and concrete filling each shell, each shell being formed of two similar sheet metal members having right angle flanges at its marginal edges, corresponding flanges of the two sheet metal members being overlapped and connected together.

9. A bolster for handling and storage of elongated objects, said bolster comprising a spaced pair of end frames and a spaced pair of connecting and spacing members interposed between and having their end portions engaged in said end frames, each end frame comprising a straight elongated metal shell having upwardly and outwardly diverging extensions at opposite ends, and concrete filling each shell, and a relatively small diameter cylindrical member attached to the upper surface of each frame member, the ends of said cylindrical member being located within said extensions and embedded in the concrete therein.

References Cited in the file of this patent
UNITED STATES PATENTS

| | | |
|---|---|---|
| 973,814 | Robinson | Oct. 25, 1910 |
| 1,029,139 | Maltrup | June 11, 1912 |
| 2,398,239 | Melin | Apr. 9, 1946 |
| 2,665,020 | Whittle | June 5, 1954 |